US010131236B2

(12) United States Patent
Neumann et al.

(10) Patent No.: US 10,131,236 B2
(45) Date of Patent: Nov. 20, 2018

(54) WIRELESS CHARGING MAGNETIC STRUCTURE

(71) Applicant: Lear Corporation, Southfield, MI (US)

(72) Inventors: Aribert Neumann, Clinton Township, MI (US); David A. Hein, Sterling Heights, MI (US); Madhur Bhattacharya, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 483 days.

(21) Appl. No.: 14/689,220

(22) Filed: Apr. 17, 2015

(65) Prior Publication Data

US 2016/0303981 A1     Oct. 20, 2016

(51) Int. Cl.
| H02J 7/00 | (2006.01) |
| B60L 11/18 | (2006.01) |
| H01F 38/14 | (2006.01) |
| H01F 3/08 | (2006.01) |
| H01F 27/36 | (2006.01) |

(52) U.S. Cl.
CPC .............. B60L 11/182 (2013.01); H01F 3/08 (2013.01); H01F 27/365 (2013.01); H01F 38/14 (2013.01)

(58) Field of Classification Search
USPC ........................................................ 320/108
See application file for complete search history.

(56) References Cited

U.S. PATENT DOCUMENTS

| 5,703,461 A | 12/1997 | Minoshima et al. |
| 7,239,110 B2 | 7/2007 | Cheng et al. |
| 7,714,537 B2 | 5/2010 | Cheng et al. |
| 2011/0181240 A1 | 7/2011 | Baarman et al. |
| 2012/0103741 A1 | 5/2012 | Suh et al. |
| 2013/0049682 A1 | 2/2013 | Niec et al. |
| 2013/0175983 A1 | 7/2013 | Partovi et al. |

(Continued)

FOREIGN PATENT DOCUMENTS

| CN | 103545940 A | 1/2014 |
| CN | 104518572 A | 4/2015 |

(Continued)

OTHER PUBLICATIONS

Boys et al., "IPT Fact Sheet Series: No. 1—Basic Concepts", Department of Electrical and Computer Engineering, The University of Auckland, 2012, 7 pages.

(Continued)

*Primary Examiner* — Robert Grant
(74) *Attorney, Agent, or Firm* — Brooks Kushman P.C.

(57) ABSTRACT

In at least one embodiment, an inductive charging coil assembly for a vehicle comprising a first base plate and a second base plate is disclosed. The first base plate includes at least one first coil for transmitting magnetic flux. The second base plate includes at least one second coil having a top side and a bottom side to receive the magnetic flux for charging a vehicle. The at least one second coil defines a window to position at least one ferrite on the top side and on the bottom side of the at least one second coil. The at least one ferrite is arranged to guide the magnetic flux from the bottom side of the at least one second side to the top side of the at least one second side and back to the bottom side of the at least one second side.

20 Claims, 5 Drawing Sheets

(56) References Cited

U.S. PATENT DOCUMENTS

2013/0270921 A1* 10/2013 Boys ................... H01F 38/14
                                                      307/104
2014/0060505 A1   3/2014 Khan et al.
2015/0077053 A1*  3/2015 Stamenic ............ H02J 7/0042
                                                      320/109

FOREIGN PATENT DOCUMENTS

| DE | 102007033654 A1 | 4/2008 |
| DE | 102008013649 A1 | 10/2009 |
| DE | 102009049432 A1 | 4/2011 |
| WO | 2010117139 A2 | 10/2010 |
| WO | 2010131983 A1 | 11/2010 |
| WO | 2011045883 A1 | 1/2011 |
| WO | 2011084936 A2 | 7/2011 |
| WO | 2012018268 A1 | 2/2012 |
| WO | 2012019664 A2 | 2/2012 |

OTHER PUBLICATIONS

German Office Action for Application No. 10 2016 205 863.0, dated Feb. 10, 2017, 11 pages.
Chinese Office Action for Application No. 201610237441.2, dated Mar. 26, 2018, 11 pages.
Hudecek et al., "A System for Precise Positioning of Vehicles Aiming at Increased Inductive Charging Efficiency", Nov. 5, 2014, 6 pages.
Yu et al., "No-load Protection and Load Detection of Wireless Charging Electric Vehicle", Chongqing University, Nov. 20, 2013, 5 pages.

* cited by examiner

WIRELESS CHARGING MAGNETIC STRUCTURE

TECHNICAL FIELD

Aspects described herein generally relate to a wireless charging magnetic structure for a vehicle.

BACKGROUND

U.S. Publication No. 2014/0060505 to Khan et al. provides an inductive charging coil assembly for a vehicle. The assembly comprises a first base plate including at least one first coil thereon for receiving magnetic flux to charge a vehicle battery. The assembly further comprises a second base plate including at least one second coil having a top surface thereof that forms an elevated portion to focus the magnetic flux to the at least one first coil.

U.S. Publication No. 2011/0181240 to Baarman et al. discloses an inductive charging system for electric vehicles. In particular, Baarman discloses a charging system for an electric vehicle that assists in aligning a primary charging coil and a secondary coil. The system may include a wheel chock that raises the primary coil into alignment with the secondary coil when a tire enters the wheel chock. The system may include a primary that is recessed below the surface supporting the vehicle and is protected by a cover. The secondary coil may be protected and supported by a skid plate mounted to the vehicle. The system may include a charging circuit that is controlled by signals transmitted by a garage door opener transmitter or a garage door opener. The system may include sensors that detect the presence of an animal or object in the space between the primary coil and the secondary coil.

SUMMARY

In at least one embodiment, an inductive charging coil assembly for a vehicle comprising a first base plate and a second base plate is disclosed. The first base plate includes at least one first coil for transmitting magnetic flux. The second base plate includes at least one second coil having a top side and a bottom side to receive the magnetic flux for charging a vehicle. The at least one second coil defines a window to position at least one ferrite on the top side and on the bottom side of the at least one second coil. The at least one ferrite is arranged to guide the magnetic flux from the bottom side of the at least one second side to the top side of the at least one second side and back to the bottom side of the at least one second side.

In at least one embodiment, an inductive charging coil apparatus for a vehicle that includes a vehicle base plate is disclosed. The vehicle base plate includes at least one coil having a top side and a bottom side for receiving magnetic flux from a second base plate to charge a vehicle. The at least one coil defines a window to receive at least one ferrite to position the at least one ferrite on the top side and on the bottom side of the at least one coil. The at least one ferrite is arranged to guide the magnetic flux from the bottom side of the at least one coil to the top side of the at least one coil and back to the bottom side of the at least one coil.

In at least one embodiment, an inductive charging coil assembly for a vehicle that comprises a first base plate and a second base plate is disclosed. The first base plate includes at least one first coil for transmitting magnetic flux. The second base plate includes at least one second coil having a top side and a bottom side to receive the magnetic flux for charging a vehicle. The at least one second coil defines a window to receive at least one ferrite to direct the magnetic flux from the bottom side to the top side of the at least one second coil. The at least one second coil defines a window including at least one ferrite to direct the magnetic flux from the bottom side of the at least one second side to the top side of the at least one second side and back to the bottom side of the at least one second side.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inductive charging, also known as wireless charging utilizes a primary coil and a secondary coil that is spaced apart from one another by an air gap. The primary coil may be positioned in a base pad whereas the secondary coil may be placed on a device (e.g., vehicle plate or vehicle pad) that is to receive energy for battery charging purposes. The primary coil and the secondary coil combine with one another to form an electrical transformer. The primary coil creates an alternating electromagnetic field or time varying magnetic field and transmits the same to the secondary coil. In turn, the secondary coil generates voltage in response to the magnetic field, which is then converted into an electrical current. The voltage and current provide the power to charge the battery.

Aspects described herein provide for a wireless charging magnetic structure (or assembly) that improves coupling between the primary coil in the base pad and the secondary coil positioned in the vehicle. For example, the secondary coil may be angled to receive at least one ferrite bar for channeling or directing magnetic flux received from the primary coil through at least one window that is formed within the secondary coil. In this case, a portion of the at least one ferrite bar may be positioned on one side of the secondary coil and another portion of the at least one ferrite bar may be positioned on another side of the secondary coil. This aspect and those describe herein may, among other things, increase an overall efficiency of wireless charging in an electrical vehicle while maintaining a small package size.

Figure 1:
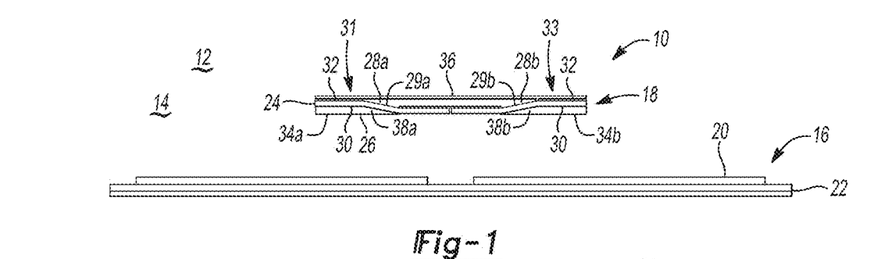
FIG. 1 depicts a side view of a wireless charging magnetic structure (or assembly) in accordance to one embodiment.

FIG. 1 depicts a side view of a wireless charging magnetic structure (or assembly) 10 in accordance to one embodiment. The assembly 10 is generally used in connection with inductively charging one or more batteries 12 in a vehicle 14. The assembly 10 includes a base plate (or pad) 16 and a vehicle base plate (or pad) (hereafter "vehicle plate 18"). The base plate 16 includes a primary coil 20 and at least one ferrite 22 (hereafter "ferrite 22"). Likewise, the vehicle plate 18 includes a secondary coil 24 and at least one ferrite 26 (hereafter "ferrite 26"). In general, the base plate 16 is physically spaced apart from the vehicle plate 18. In general, the base plate 16 may be positioned on a horizontal surface such as a floor and the vehicle plate 18 may be positioned on an underside of the vehicle 14.

The primary coil 20 of the base plate 16 is capable of enabling energy transfer via magnetic induction and resonant operation at a predetermined frequency to the secondary coil 24 of the vehicle plate 18 to provide wireless charging of the battery 12. In general, magnetic flux from the primary coil 20 (when energized) and the ferrite 22 may be directed toward the secondary coil 24 and the ferrite 26 to provide for efficient energy transfer and stronger magnetic coupling. The primary coil 20 and the secondary coil 24 may form a loosely coupled transformer. The primary coil 20 creates and transmits a magnetic field (or magnetic flux) to the secondary coil 24. In turn, the secondary coil 24 generates voltage in response to the magnetic field which is then converted into electrical current to charge the battery 12.

The secondary coil 24 generally includes at least one angled portion 28 for receiving ferrite 26. The at least one angled portion (e.g., 28a or 28b as shown in FIG. 1) that forms an incline relative to other portion of the secondary coil 24. In the assembly 10, the secondary coil 24 may include a first angled portion 28a on one side of the secondary coil 24 and a second angled portion 28b on another side of the secondary coil 24. As will be shown in more detail below, each side of the secondary coil 24 forms or defines a window 29a and 29b on each angled portion 28a and 28b. The secondary coil 24 includes a first side 30 and a second side 32. The first side 30 is orientated toward the floor upon which the base plate 16 rests. The second side 32 is orientated to face up, into the vehicle 14. The windows 29a and 29b formed on the angled portions 28a and 28b, respectively, receive the ferrite 26 such that at least one first portion 34 (see 34a and 34b ) of the ferrite 26 is positioned below the first side 30 of the secondary coil 24 (or below the secondary coil 24). Additionally, the windows 29a and 29b on the angled portions 28a and 28b, respectively, receive the ferrite 26 such that a second portion 36 of the ferrite 26 is positioned above the second side 32 of the secondary coil 24 (or above the secondary coil 24).

The ferrite 26 includes a first joining portion 38a for coupling the first portion 34a to the second portion 36 on one side of the ferrite 26. The ferrite 26 includes a second joining portion 38b for coupling the first portion 34b to the second portion 36 on an opposite side of the ferrite 26. As can be seen in FIG. 1, the ferrite 26 forms a generally ninety degree angle at the first portion 34a, the first joining portion 38a, and the second portion 36 of the ferrite 26. Likewise, the ferrite 26 forms a generally ninety degree angle at the first portion 34b, the second joining portion 38b and the second portion of the ferrite 26. These aspects enable the ferrite 26 to be positioned on both the first side 30 (e.g., bottom side) of the secondary coil 24 and the second side 32 (e.g., top side) of the secondary coil 24. In this configuration, the ferrite 26 guides the magnetic flux from the base plate 16 from the first side 30 of the secondary coil 24 at a first end 31 to the second side 32 of the secondary coil 24 and back through the first side 30 of the secondary coil 24 at a second end 33 of the secondary coil 24. As shown, the first end 31 of the secondary coil 24 is positioned opposite to the second end 33 of the secondary coil 24. The windows 29a and 29b are configured to receive the first joining portion 38a and the second joining portion 38b, respectively. As shown in FIG. 1, a top portion of the ferrite 26 overlaps a bottom portion of the ferrite in the window 29a or 29b (e.g., where the ferrite 26 is positioned in the window 29a or 29b relative to the angled portions 28a or 28b)

By orientating the first portion 34a and/or 34b of the ferrite 26 to be positioned below secondary coil 24 and orientating the second portion 36 of the ferrite 26 to be positioned above the secondary coil 24, this condition enables the ferrite 26 to gather the magnetic flux from the primary coil 20 and to circulate, channel, or direct the magnetic flux through the windows 29a and 29b (and through the first end 31 and the second end 33 of the secondary coil 24 as described above) formed in the secondary coil 24 to increase the magnetic coupling between the primary coil 20 and the secondary coil 24. In general, the amount of magnetic flux that travels through the windows 29a and 29b determines the amount of magnetic coupling between the primary coil 20 and the secondary coil 24. Thus, because the ferrite 26 increases the amount of magnetic flux through the windows 29a and 29b of the secondary coil 24, the primary coil 20 and the secondary coil 24 exhibit greater levels of magnetic coupling.

Figure 2:
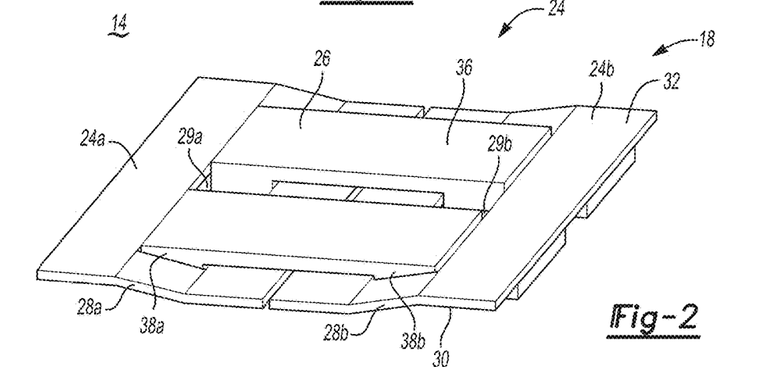
FIG. 2 depicts a top view of a vehicle plate of the assembly of FIG. 1 in accordance to one embodiment.

FIG. 2 depicts a top view of the vehicle plate 18 of the assembly 10 in accordance to one embodiment. In general, the second side 32 of the secondary coil 24 faces into the vehicle 14 and the first side 30 of the secondary coil 24 faces the base plate 16. Thus, the top view of the vehicle plate 18 as shown in FIG. 2 faces down into the base plate 16. The vehicle plate 18 is attached to the vehicle 14. The base plate 16 is vertically displaced from the vehicle (i.e., from the vehicle plate 18) and may be positioned on a flat surface below the vehicle 14. FIG. 2 also depicts that the secondary coil 24 is arranged to receive two ferrites 26. Each ferrite 26 may be separate from one another, or may be combined with one another to form a single piece. It is recognized that the secondary coil 24 may be arranged to receive any number of ferrites 26. As shown, the secondary coil 24 comprises two generally D-shaped coils 24a, 24b that may or may not be attached to one another. The particular shape of the ferrite 26 may vary based on the desired criteria of a particular implementation. This will be discussed in more detail below.

Figure 3A:
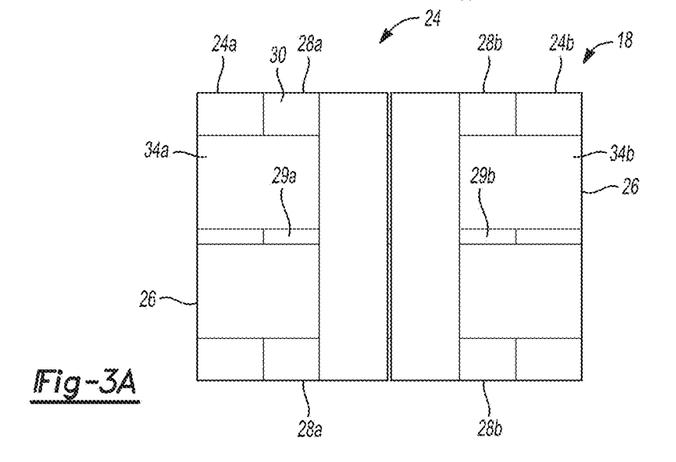
FIG. 3A depicts a bottom view of the vehicle plate of the assembly in accordance to one embodiment.
Figure 3B:
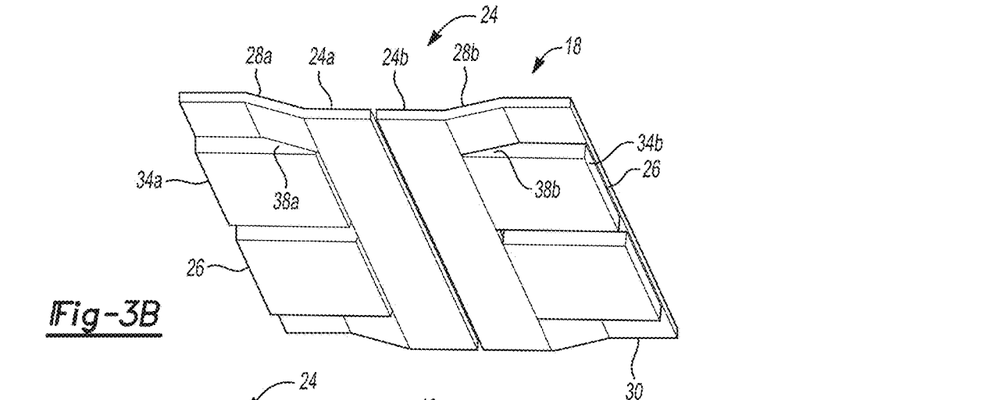
FIG. 3B depicts an elevated bottom view of the vehicle plate of the assembly in accordance to one embodiment.

FIG. 3A depicts a bottom view of the vehicle plate 18 of the assembly 10 in accordance to one embodiment. In general, the bottom side (or the first side 30 of the secondary coil 2) faces the base plate 16. The assembly 10 as depicted in FIG. 3A illustrates that two ferrites 26 are received by the secondary coil 24. In this implementation, the ferrites 26 are connected together on the second side 32 (or the top side) of the secondary coil 24. It is recognized that the ferrites 26 may be joined with one another, or may be separate from one another. FIG. 3B depicts an elevated bottom view of the vehicle plate 18 of the assembly 10 in accordance to one embodiment.

Figure 4A:
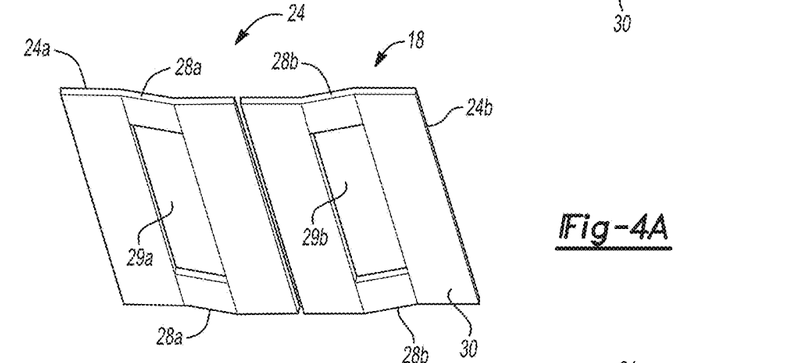
FIG. 4A depicts an elevated bottom view of the secondary coil in accordance to one embodiment.
Figure 4B:
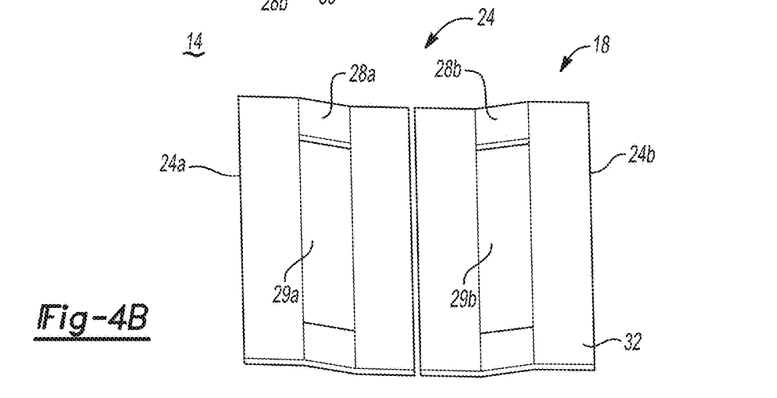
FIG. 4B depicts a top view of the secondary coil in accordance to one embodiment.

FIG. 4A depicts a top view of the secondary coil 24. As noted above, the first side 30 (or top side) of the secondary coil 24 is arranged to face the base plate 16. The secondary coil 24 generally comprises two generally D-shaped coils 24a, 24b that may or may not be attached to one another. Each coil 24a and 24b defines a corresponding window 29a and 29b, respectively for receiving the at least one ferrite 26. FIG. 4B depicts a top view of the secondary coil 24. As noted above, the second side 32 of the secondary coil 24 is arranged to face the vehicle 14.

Figure 5:
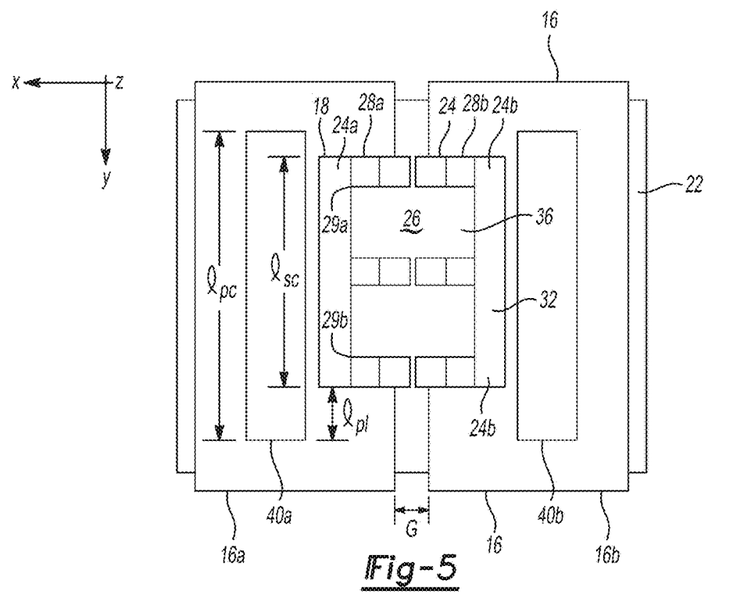
FIG. 5 depicts a top view of the vehicle plate being positioned over the base plate in accordance to one embodiment.

FIG. 5 depicts a top view of the vehicle plate 18 positioned over the base plate 16 in accordance to one embodiment. This illustration is generally representative of the position of the vehicle plate 18 in reference to the base plate 16 when the vehicle 14 is undergoing a charging operation. The primary coil 20 may also include two D-shaped coils 16a and 16b that may be spaced apart from one another by a gap G in the x-direction. In one example, the gap G may be 100 mm. Each coil 16a and 16b also define a corresponding window 40a and 40b, respectively. The ferrite 26 of the base plate 16 is positioned underneath each coil 16a and 16b. As shown, an overall length and width of the primary coil 20 is greater than an overall length and width of the secondary coil 24. This condition is provided to ensure that the vehicle plate 18 is positioned over the base plate 16 (e.g., in the z-axis which extends through the page) to account for possible misalignment in the x and/or y direction (or axis) when the vehicle 14 is parked over the base plate 16 for purposes of charging the battery 12.

In general, each of the windows 40a and 40b as formed in the primary coil 20 may have a corresponding length, $l_{pc}$ which also includes a positional tolerance or a positional length $l_{pl}$. The inclusion of the positional length $l_{pl}$ in the primary coil 20 increases the overall size of the primary coil 20. The overall length of the secondary coil 24 may be defined by $l_{sc}$. Thus, in this case, it is desirable to entirely place the vehicle plate 18 somewhere over the length $l_{pc}$ and coincident to window 40a and/or 40b. In general, with inductive charging, it is recognized that some degree of length (or tolerance $l_{pl}$) is needed to account for different positions of the vehicle plate 18 over the base plate 16 (i.e., different locations of the vehicle plate 18 over the base plate 16 when the vehicle 14 is being parked). Thus, in this regard, the length $l_{pc}$ of the windows 40a and 40b are arranged to be equal or greater than the overall length of the secondary coil (e.g., $l_{sc}$) and the positional length, $l_{pl}$. This condition ensures that the vehicle plate 18 and the base plate 16 obtain a generally uniform coupling coefficient response when the vehicle 14 is parked over the base plate 16 during a charging operation. In general, in order to assure optimum charging performance, the assembly 10 generally allows for an amount of variability of the vehicle position relative to the charging pad (or base plate 16). The amount that the vehicle 12 can be misaligned is a misalignment tolerance. The positional positional length $l_{pl}$ may be the vehicle side-to-side misalignment tolerance.

Figure 6:
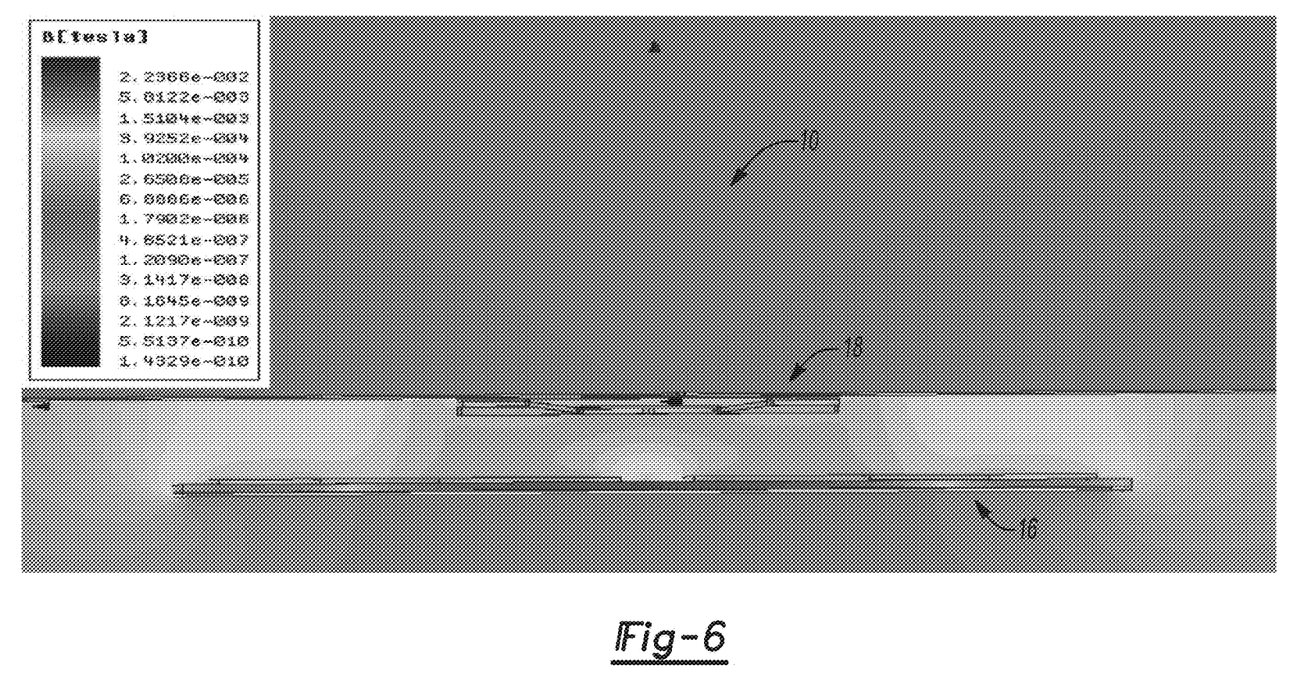
FIG. 6 illustrates a modeling of the magnetic coupling and field distribution between the base plate side and the vehicle plate of the assembly in accordance to one embodiment.

FIG. 6 illustrates a modeling of the magnetic coupling and field coupling between the base plate 16 and the vehicle plate 18 of the assembly 10. As can be seen, the modeling illustrates that the magnetic flux density between the windows 29a-29b on the secondary coil 24 and the windows 40a-40b on the primary coil 20 is somewhere between $1.5104 \times 10^{-3}$ and $5.812210^{-3}$. Naturally, the magnetic flux density decreases for locations positioned further away from the windows 29a-29b on the secondary coil 24 and the windows 40a-40b on the primary coil 20.

Figure 7:
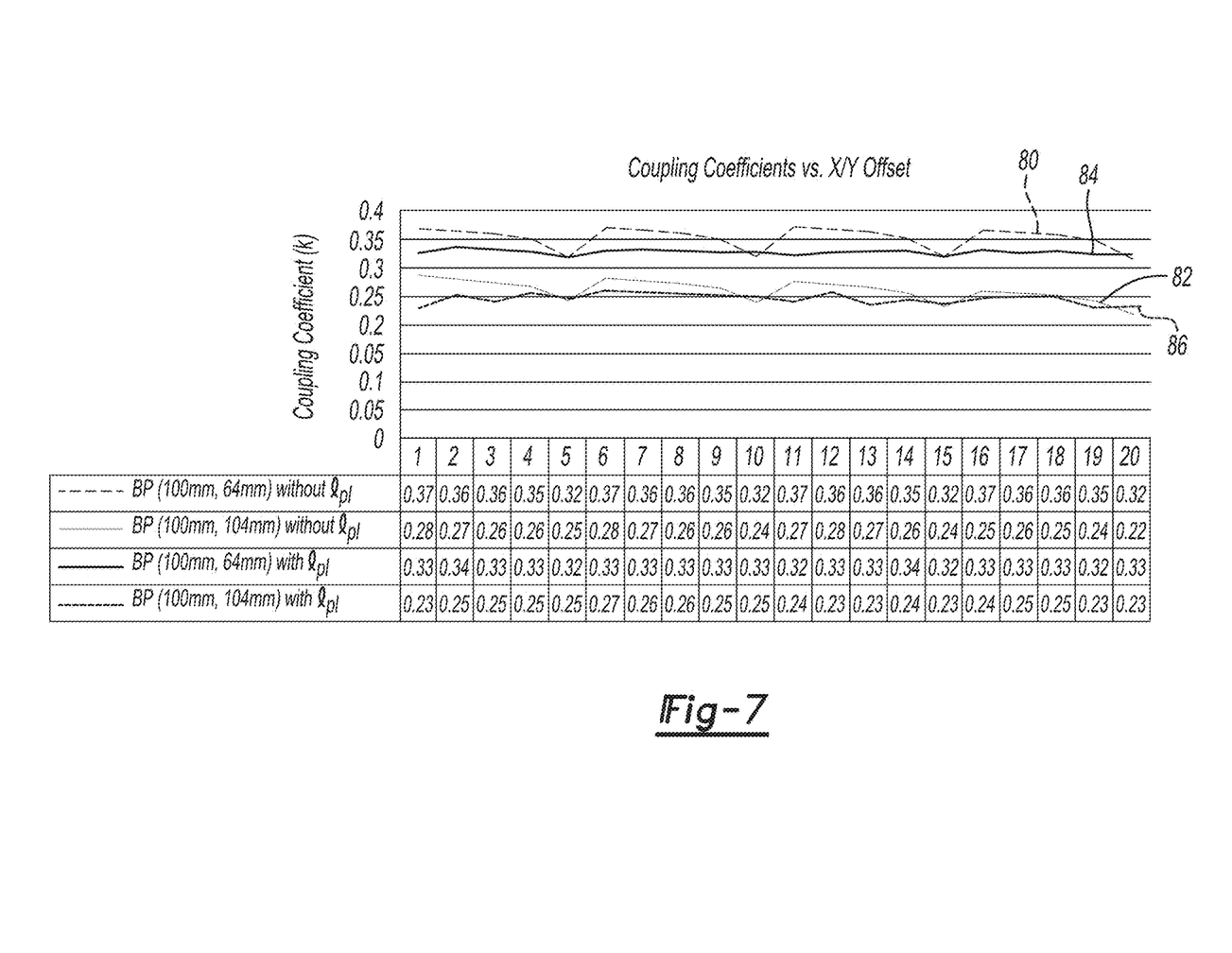
FIG. 7 is a plot illustrating a coupling coefficient for the assembly at various offsets on the x axis and the y axis.

FIG. 7 is a plot illustrating a coupling coefficient for the assembly 10 at various offsets on the z-axis and the x-axis (see FIG. 5 for the z-axis and the x-axis). In general, the coupling coefficient between the base plate 16 and the vehicle plate 18 is illustrated for an implementation that does not utilize the positional tolerance $l_{pl}$ (e.g., no additional tolerance is utilized in the assembly 10 which decreases the overall size of the base plate 16—this condition requires a closer placement or a smaller offset between the base plate 16 and the vehicle plate 18 during vehicle charging) and for an implementation that utilizes the positional tolerance $l_{pl}$ as discussed in connection with FIG. 5 where the overall size of the base plate 16 is increased to ensure that the base plate 16 and the vehicle plate 18 obtain a uniform coupling coefficient response when the vehicle 14 is parked over the base plate 16 during a charging operation. The plot of FIG. 7 generally illustrates performance of the assembly 10 with misalignment in three possible directions such as for example, side to side, fore to aft in the driving direction, and differences in the vehicle ride height.

Data group 80 generally corresponds to the coupling coefficient with an offset of (100 mm (e.g., in the z-direction), 64 mm (e.g., in the x-direction)) for the assembly 10 that does not utilize the positional tolerance $l_{pl}$ which in turn reduces the overall size of the primary coil 20. Data group 82 generally corresponds to the coupling coefficient with an offset of (100 mm (e.g., in the z-direction), 104 mm (e.g., in the x-direction)) for the assembly 10 that does not utilize the positional tolerance $l_{pl}$ which in turn reduces the overall size of the primary coil 20. Data group 84 generally corresponds to the coupling coefficient with an offset of (100 mm (e.g., in the z-direction), 64 mm (e.g., in the x-direction)) for the assembly 10 that utilizes the positional tolerance $l_{pl}$.

As shown, the data group 84 is generally more uniform than the data group 80 (i.e., the data group 84 does not include varying levels of dips with the coupling coefficient which in turn provides a uniform coupling coefficient between the primary coil 20 and the secondary coil 24). This condition is realized due to the length $l_{pc}$ being greater than the length, $l_{sc}$ of the secondary coil 24 and the positional length $l_{pl}$ as described in connection with FIG. 5. Data group 86 generally corresponds to the coupling coefficient with an offset of (100 mm (e.g., in the z-direction), 104 mm (e.g., in the x-direction)) for the assembly 10 that utilizes the positional tolerance $l_{pl}$. As shown, the data group 86 is generally more uniform than the data group 82 (i.e., the data group 86 does not include varying levels of dips with the coupling coefficient). Due to the varying level of dips that are present in the data groups 80 and 82, the assembly 10 may need to draw more current during the vehicle charging operation to account for these dips to ensure that the current output therefrom does not drop in response to the dips.

The assembly 10 as described herein may increase the efficiency of wireless charging of the vehicle 14 while maintaining a small package size. In general, the wireless charging is performed by creating, for example, an 85 kHz magnetic field from primary coil 20 that is received at the secondary coil 24 that is attached to the vehicle 14. Each of the primary coil 20 and the secondary coil 24 form two generally "D" shaped coils for the transmission of the magnetic field and the reception of the magnetic energy, respectively.

The amount of flux that travels through the center of windows 29*a* and 29*b* of the secondary coil 24 determines the amount of coupling between the primary coil 20 and the secondary coil 24. Previous technologies may utilize a large window area in the receive coil to gather more flux from the base coil. However, this condition creates a rather large and heavy primary coil and secondary coil. The secondary coil 24 includes at least one ferrite 26 that faces down, toward the primary coil 20 to gather or receive the magnetic flux from a larger area and to channel the magnetic flux through the windows 29*a* and 29*b* on the secondary coil 24. This aspect provides for a larger effective window area than conventional implementations while reducing packaging space on the vehicle 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive charging coil assembly for a vehicle comprising:
    a first base plate including at least one first coil for transmitting magnetic flux; and
    a second base plate including at least one second coil having a top side and a bottom side to receive the magnetic flux for charging a vehicle,
        wherein the at least one second coil defines a window to position at least one ferrite on the top side and on the bottom side of the at least one second coil, and
        wherein the at least one ferrite is arranged to guide the magnetic flux from the bottom side of the at least one second coil to the top side of the at least one second coil and back to the bottom side of the at least one second coil.

2. The assembly of claim 1 wherein the at least one first coil is a primary coil.

3. The assembly of claim 2 wherein the at least one second coil is a secondary coil.

4. The assembly of claim 1 wherein the at least one second coil includes an angled portion that defines the window.

5. The assembly of claim 4 wherein the angled portion receives a joining portion of the at least one ferrite to position the at least one ferrite on the top side and on the bottom side of the at least one second coil.

6. The assembly of claim 4 wherein the angled portion forms an incline relative to remaining portions of the at least one second coil.

7. The assembly of claim 1 wherein the second base plate is positioned on the vehicle for receiving the magnetic flux from the first base plate.

8. The assembly of claim 1 wherein the first base plate is horizontally spaced apart from the second base plate.

9. The assembly of claim 1 wherein an overall size of the first base plate is greater than an overall size of the second base plate to provide for a uniform coupling coefficient between the first base plate and the second base plate.

10. The assembly of claim 1 wherein the at least one ferrite includes a top portion and a bottom portion and wherein the top portion overlaps the bottom portion.

11. An inductive charging coil apparatus for a vehicle comprising:
    a vehicle base plate including at least one coil having a top side and a bottom side for receiving magnetic flux from a second base plate to charge a vehicle,
        wherein the at least one coil defines a window to receive at least one ferrite to position the at least one ferrite on the top side and on the bottom side of the at least one coil, and
        wherein the at least one ferrite is arranged to guide the magnetic flux from the bottom side of the at least one coil to the top side of the at least one coil and back to the bottom side of the at least one coil.

12. The apparatus of claim 11 wherein the at least one coil is a secondary coil for receiving the magnetic flux from a primary coil positioned on the second base plate.

13. The apparatus of claim 11 wherein the at least one coil includes an angled portion that defines the window.

14. The apparatus of claim 13 wherein the angled portion receives a joining portion of the at least one ferrite to position the at least one ferrite on the top side and on the bottom side of the at least one coil.

15. The apparatus of claim 13 wherein the angled portion forms an incline relative to remaining portions of the at least one coil.

16. The apparatus of claim 11 wherein the vehicle base plate is positioned on the vehicle for receiving the magnetic flux from the second base plate.

17. The apparatus of claim 11 wherein the at least one ferrite includes a top portion and a bottom portion and wherein the top portion is positioned directly above the bottom portion.

18. An inductive charging coil assembly for a vehicle comprising:
    a first base plate including at least one first coil for transmitting magnetic flux; and
    a second base plate including at least one second coil having a top side and a bottom side to receive the magnetic flux for charging a vehicle,
        wherein the at least one second coil defines a window including at least one ferrite to direct the magnetic flux from the bottom side of the at least one second coil to the top side of the at least one second coil and back to the bottom side of the at least one second coil.

19. The assembly of claim 18 wherein the at least one second coil receives the at least one ferrite at the window to position the at least one ferrite on the top side and on the bottom side of the at one second coil.

20. The assembly of claim 18 wherein the first base plate is horizontally spaced apart from the second base plate.

\* \* \* \* \*